US006153039A

United States Patent [19]

Jacobsen

[11] Patent Number: 6,153,039

[45] Date of Patent: Nov. 28, 2000

[54] CARD AND METHOD OF MAKING SAME

[76] Inventor: Gary A. Jacobsen, 225 S. Cherry, Itasca, Ill. 60143

[21] Appl. No.: 08/147,093

[22] Filed: Nov. 3, 1993

Related U.S. Application Data

[63] Continuation of application No. 07/828,518, Jan. 31, 1992, abandoned.

[51] Int. Cl.[7] .......... B32B 31/00

[52] U.S. Cl. .......... 156/277; 156/253; 40/445; 40/491; 283/98; 283/105

[58] Field of Search .......... 156/514, 253, 156/108, 277; 40/445, 491, 124.4, 124.1, 158.1; 283/56, 106, 109, 98, 105

[56] References Cited

U.S. PATENT DOCUMENTS

| | | | |
|---|---|---|---|
| 418,135 | 12/1889 | Kaufmann . | |
| 946,407 | 1/1910 | Spiegel . | |
| 2,311,946 | 2/1943 | Kroner | 40/159.2 |
| 2,359,195 | 9/1944 | Berliner et al. . | |
| 2,367,967 | 1/1945 | Schwartz . | |
| 2,611,201 | 9/1952 | Bellis . | |
| 2,639,254 | 5/1953 | Smith | 156/116 |
| 2,804,202 | 8/1957 | Davis | 206/456 |
| 3,235,991 | 2/1966 | Harper et al. | 40/159.2 |
| 3,848,348 | 11/1974 | Hawley . | |
| 3,974,014 | 8/1976 | Meisner et al. | 156/277 |
| 4,514,248 | 4/1985 | Cummings | 156/277 |
| 4,566,927 | 1/1986 | Wood | 156/277 |
| 4,661,189 | 4/1987 | Voy et al. | 156/277 |
| 4,664,416 | 5/1987 | Steidinger | 282/11.5 |
| 4,697,364 | 10/1987 | Dean . | |
| 4,721,635 | 1/1988 | Helinski | 156/277 |
| 4,824,143 | 4/1989 | Grainger . | |
| 4,824,503 | 4/1989 | Wilen | 156/277 |
| 4,890,872 | 1/1990 | Parrotta et al. . | |
| 4,938,830 | 7/1990 | Cannistra | 156/277 |
| 4,972,655 | 11/1990 | Ogawa | 156/277 |
| 5,000,486 | 3/1991 | Rua, Jr. et al. . | |
| 5,037,139 | 8/1991 | Schoenleber et al. . | |
| 5,118,375 | 6/1992 | Malacrowski et al. | 156/277 |

*Primary Examiner*—Merrick Dixon

[57] ABSTRACT

A method of forming a novelty card using an in-line web offset printing and production process, including the steps of providing a web of printable material and a web of a transparent material of a predetermined width to a printing apparatus. A strip of the printable material is formed having at least a front panel, a rear panel and an insert panel. At least one image is printed on the rear panel, and at least one image is printed on the transparent material. A window is formed in the front panel through which the printed image on the rear panel can be viewed. A panel is then formed from the portion of the transparent material bearing the printed image. The panel is secured to the front panel so that it spans the window. The insert is separated from the strip of printable material and positioned onto the front panel to separate the images. The rear panel is folded onto the front panel so that the image on the second side of the rear panel is aligned with the interior of the window and viewable therethrough. The rear panel is then secured to the front panel to form a pocket or envelope with at least one opening which slidably accepts and retains the insert.

19 Claims, 5 Drawing Sheets

CARD AND METHOD OF MAKING SAME

RELATED APPLICATIONS

This is a continuation of application Ser. No. 07,828,518, filed Jan. 31, 1992, now abandoned.

BACKGROUND OF THE INVENTION

The present invention relates generally to a novelty card having printed images thereon and the method for making the same where, upon removal of an insert from the card by the user, a foreground image is combined with a background image to produce a new, combined image. The novelty card can be used as a magazine insert component, direct mail unit, hand out, or other means within the print media area of the graphic arts industry.

Novelty cards having an image which changes upon the removal or repositioning of a panel, divider or insert have been known for some time. Typically, these novelty cards have a foreground image printed upon a transparent sheet, which is separated by a divider from a background image printed on an opaque sheet of paper. The transparent sheet and the opaque sheet are attached along one of their respective edges, and together straddle a divider which is fixed to the card and which keeps the images separated. The background image is hidden from view until the attached transparency and opaque sheet are pulled out of the card and spatially displaced from the divider. Upon pulling the sheets from the card, the foreground image is superimposed upon, and combines with the background image to either complete the foreground image or to create a new, combined image. The opaque sheet may include laterally projecting stop tabs to prevent the complete withdrawal of the sheets from the card. U.S. Pat. No. 4,697,364 to Dean is an example of this type of novelty card.

Unfortunately, because currently available novelty cards of the type described are generally expensive and complicated and slow to manufacture, they have not been extensively used in volume type advertising, promotion or other commercial uses. The high costs of manufacturing currently available novelty cards having changeable images is basically attributable to the limitations of typical basic printing and off-line assembly machinery, and usually by human hand operations.

Novelty cards of this type generally use a fixed divider that separates the images, and are manufactured by complicated separate functions and expensive folding, die cutting and gluing techniques that cannot be performed on in-line web offset printing and/or in-line finishing systems. Currently available novelty card production processes require costly and time consuming reorientation of the paper and transparency plastic webs, and multiple passes through the printing, die cutting, folding and gluing assembly machinery to manufacture the cards properly.

Further, currently available novelty cards of this type typically entail the use of costly photographic techniques for forming the desired images to be used on the card. Finally, not only is it expensive to manufacture such novelty cards, but the availability of such novelty cards has been limited because those in the printing business have not found it technically practical to make the necessary adaptations to their production lines.

SUMMARY OF THE INVENTION

Accordingly, a primary object of the present invention is to provide a commercially feasible multiple panel novelty card, with the desired images printed on selected panels of the card, and which allows the user to change the image by removing an insert panel, while achieving cost effectiveness.

It is another object of the present invention to provide an inexpensive novelty card having at least one foreground image and at least one background image separated by a divider so the displacement of the divider relative to the images produces a new, combined image.

It is yet another object of the present invention to provide a method of manufacturing a changeable image type novelty card using an in-line web offset printing and in-line finishing system without having to change equipment or to stop the manufacturing line for reorienting the webs of materials being used.

In accordance with the present invention, all of these objects, as well as others not herein identified, are achieved generally by the present novelty card and method for making the same, wherein a removable center ply panel insert is positioned between a front panel and a rear panel. The front panel has a window with a transparent plastic material spanning the window. The front and rear panels are secured together on their lateral edges to form an envelope-like structure defining a path in which the center ply panel insert can be slidably inserted and removed. In the preferred embodiment, a foreground image is formed on the transparent material, and a background image is formed on the rear panel. The card, and particularly the insert, is of a printable material so that the insert separates the images and conceals the background image until the insert is displaced from the inside of the completed card.

More particularly, the present novelty card is made by first providing a web of printable material of fine paper stock and a web of transparent plastic material to the appropriate offset or gravure printing and finishing production system. A strip of the printable material is formed, or otherwise distinguished, from the remaining web of printable material. The strip is scored so as to define at least a front panel, a rear panel and an insert panel, each panel having a first side and a second side. The strip of printable material and the transparent material are then each printed with at least one image. Particularly, the background image is formed on the second side of the rear panel, while the foreground image is formed on the transparent material. The printed images are cured using hot or cold processing systems. At least one window, through which the background image will be visible, is formed, such as by die cutting, in the front panel.

A panel is then formed from the transparent material and applied to the strip of printable material such that the panel of transparent material spans the window formed in the front panel. The panel formed from the transparent material bears the image previously printed thereon. The transparent panel is then treated with the appropriate amount of permanent adhesive in predetermined locations and secured to the front panel to span the window.

An insert is formed from the insert panel by ribbon positioning or plow folding the insert panel onto the side of front panel having the transparent panel, separating the insert panel from the strip, and trimming the insert panel to form a slidably removable insert which is used to separate the foreground image from the background image.

The rear panel is then treated with the appropriate amount of permanent adhesive in predetermined locations by in-line finishing gluers, ribbon or plow folded onto the side of the front panel having the transparency and the insert, and secured to the periphery of the second side of the front panel, leaving at least one opening which forms a pocket or envelope defining a path for slidably accepting and retaining the insert.

A feature of the manner of making the present novelty card is that it can be produced without the need of costly photographic imaging techniques, and utilizes less costly in-line web offset or gravure printing and in-line finishing systems, not requiring any human hand labor assistance. Furthermore, another feature of the present novelty card is that the card can be manufactured on an in-line web offset printing and in-line finishing system of the type typically used in the industry without having to make multiple passes through the machine and without having to reorient the paper and transparency webs during assembly. Accordingly, an advantage of the present novelty card is that it is less costly, complicated and time consuming to manufacture than presently available novelty cards, and can be produced without utilizing costly photographic processes.

BRIEF DESCRIPTION OF THE DRAWINGS

Further objects of the invention, together with additional features contributing thereto and advantages occurring therefrom, will be apparent from the following description of the invention when read in conjunction with the accompanying drawings, wherein:

FIG. 2-B is a front elevational view depicting the assembled novelty card of FIG. 2-A with the insert partially displaced, thereby exposing the background image, which combines with the foreground image to produce the desired new or combined image;

FIG. 3-B is a front elevational view depicting the novelty card of FIG. 3-A wherein the insert, also having an image formed thereon, has been partially removed;

DETAILED DESCRIPTION OF THE PREFERRED EMBODIMENT

Figure 1:
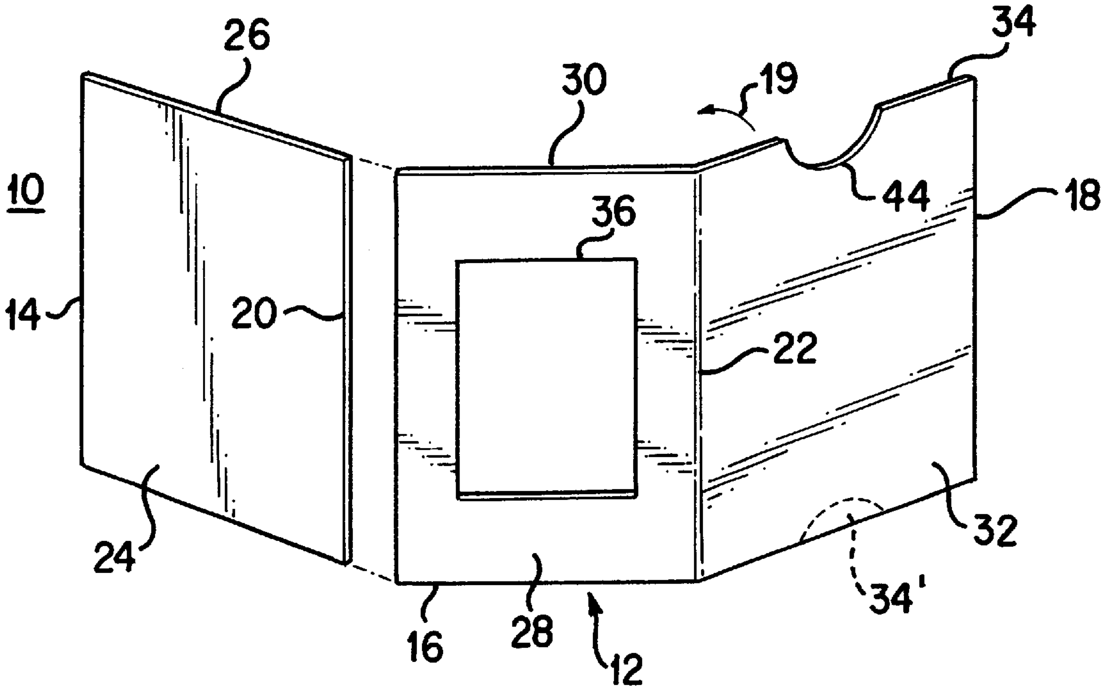
FIG. 1 is a front perspective view of the novelty card of the invention in strip form depicting the panels and the window prior to assembly.
Figure 2A:
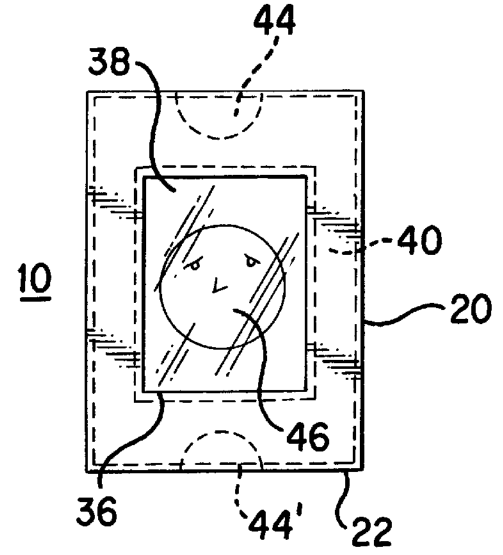
FIG. 2-A is a front elevational view depicting the assembled novelty card of the present invention with the insert concealing the background image.
Figure 2B:
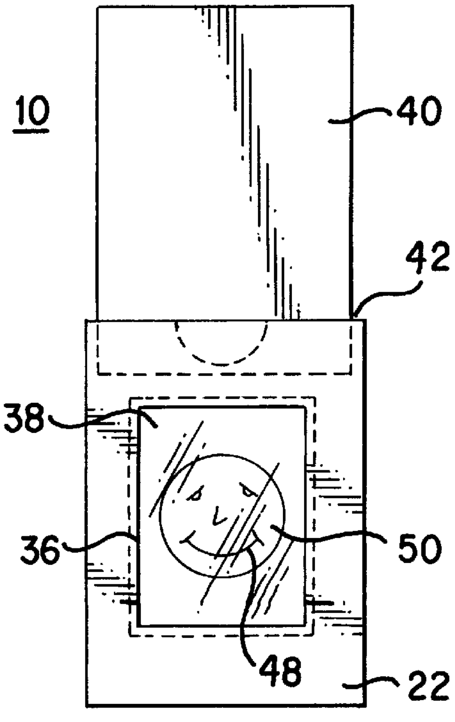

Referring more particularly to the drawings, in FIGS. 1, 2-A and 2-B, the present novelty card is designated as 10. The card 10 is constructed from a scored and cut single strip of printable material 12 which is configured to form three primary panels or layers: an insert panel 14, a front panel 16, and a rear panel 18. Scorelines 20 and 22 are disposed in spaced parallel relation along the strip 12 and thereby define or distinguish the strip 12 into the insert, front and rear panels, 14, 16 and 18. Each of the panels has at least a first side and a second side. Insert panel 14 has a first side 24 and a second side 26, front panel 16 has a first side 28 and a second side 30, and rear panel 18 has a first side 32 and a second side 34. Furthermore, front panel 16 has a window 36 formed therein.

In the preferred embodiment, the completed card 10 is essentially four layers. In addition to the panels 14, 16 and 18, a transparent panel 38 is secured to the periphery of the window 36 on the second side 30 of the front panel 16. An insert 40, formed from insert panel 14, is positioned onto the second side 30 of the front panel 16 and a rear side of the transparent panel 38. The rear panel 18 is folded, in the direction indicated by arrow 19 (best seen in FIG. 1) to a position behind the front panel 16. Once folded over, the second side 34 of the rear panel 18 is secured to the second side 30 of front panel 16 along the lateral side edges of each panel to form a pocket or envelope with an opening 42 (FIG. 2B) configured to slidably accept the insert 40. The opening 42 will typically be located along an upper edge between the front and rear panels 16 and 18. Another opening is also located at the lower edges of panels 16 and 18, since the panels 16 and 18 are attached only on their lateral edges.

As shown in FIG. 1, insert panel 14 is detached from the strip 12 along scoreline 20 and trimmed to slidably fit into the pocket 42 formed between the rear panel 18 to the front panel 16. The rear panel 18 may have formed thereon, prior to its application to the front panel 16, a notch 44 to facilitate removal and insertion of the insert 40 in the completed card 10.

Once completed, as shown in FIGS. 2-A and 2-B, the card 10 will have at least one visible foreground image 46 formed on the transparent panel 38, shown here for purposes of simple illustration as an incomplete face. Similarly, at least one background image 48 will be formed on the second side 34 (FIG. 5) of the rear panel 18. Upon removal, or at least partial vertical displacement of the insert 40 from the pocket 42, the background image 48 combines with the foreground image 46 to form a completed, changed or new image 50. The images 46 and 48 are printed on the respective panels 38 and 18 so that they are visible through the window 36. As illustrated, the foreground image 46 is a face absent a mouth, and the background image 48 is a smiling mouth only. In the assembled card 10, the user can vertically slide the insert 40 to reveal the background image 48 to form the completed or changed image 50, a complete face with a smile. It will be appreciated that the background image 48 may add color, depth or other detail to features already present in the foreground image 46.

Figure 3A:
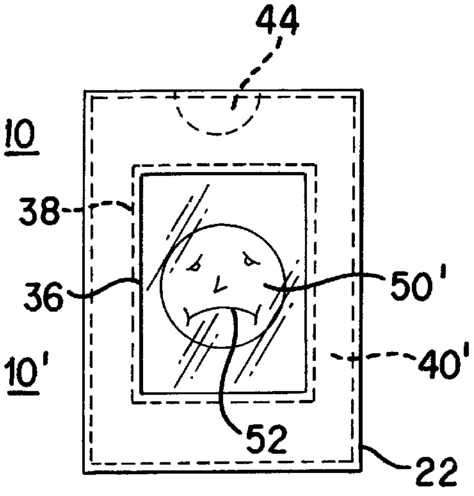
FIG. 3-A is a front elevational view depicting an alternative embodiment of the present novelty card wherein the insert, having a printed image thereon, is fully inserted and combines with the foreground image to produce a new or combined image.
Figure 3B:
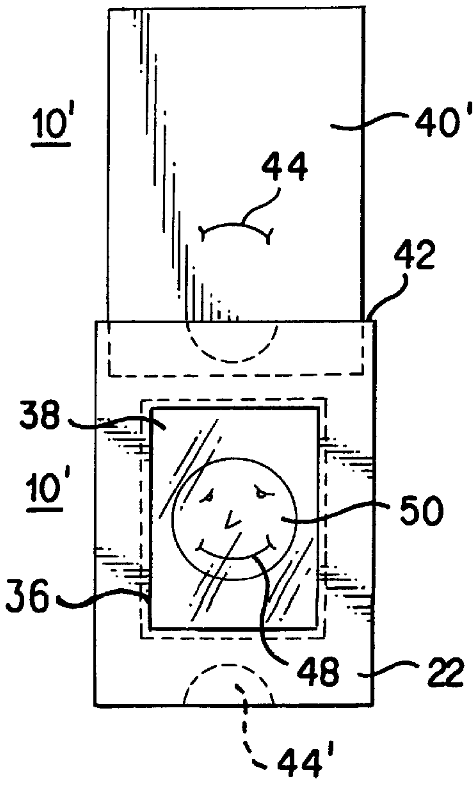

In an alternative embodiment, here illustrated in FIGS. 3-A and 3-B, and designated as 10', components which are identical to those of card 10 are designated with the same reference numbers. Components which have been modified are designated with the same number used in FIGS. 2-A and 2-B and a prime ('). In the card 10', the insert 40' is provided with an image 52 printed thereon, which, when fully inserted into the card 10' combines with the foreground image 46 to form a new image 50', shown here as a frowning face. When the user slides the insert 40' up or removes insert 40', as illustrated in FIG. 3-B, the background image 48 on side 34 of rear panel 18 combines with the foreground image 46 to once again form image 50, the smiley face.

Figure 5:
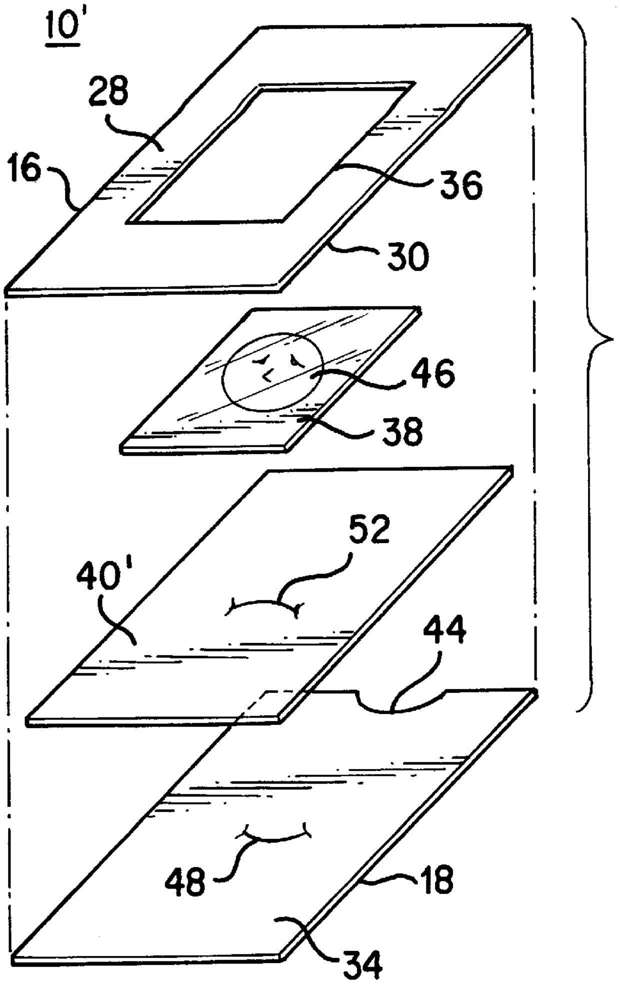
FIG. 5 depicts an exploded top perspective view of the novelty card of FIG. 3-A.

The various panels of the cards 10 and 10' are seen exploded in FIG. 5. In this view of the card 10', the front panel 16 is clearly shown with a window 36 cut therethrough. The transparent panel 38 is shown beneath the front panel 16, and is provided with the foreground image 46, shown here as a partial face without a mouth. The transparent panel 38 is secured to the second side 30 of the front panel 16, and is dimensioned to span the window 36. It will be appreciated that the window 36 is designed so that images 46, 48, 50, 50' and 52 can be fully viewed therethrough when all the panels, 14, 16 and 18, are applied together to form the completed card 10, or 10'.

The slidable insert 40 is depicted in FIG. 5 as alternative insert 40', since an image 52 of a frown has been provided. The transparent panel 38, with an image 46 printed thereon, is located between the insert 40 or 40' and front panel 16. Next, rear panel 18 is shown having background image 48 printed thereon, shown as a smile, and having the notch 44 cut into an upper edge. The second side 34 of the rear panel 18 is secured to the periphery of the second side 30 of the front panel 16, leaving at least one opening (not shown), preferably along the upper edge having the notch 44, to create an envelope or pocket 42 through which the insert 40, or 40', may be slid when being pulled up to reveal the completed images 50 or 50'.

Figure 6:
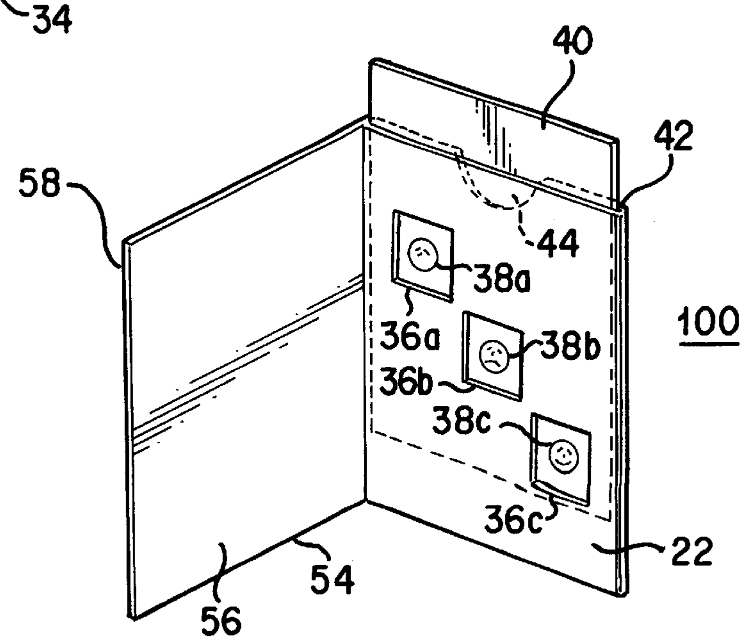
FIG. 6 depicts a front perspective view of another alternative embodiment of the present novelty card after assembly.

Shown in FIG. 6 is another alternative embodiment of the present novelty card 10, which is generally designated 100 and is provided with an optional cover panel 54. The cover panel 54 includes a first side 56 and a second side 58. Cover panel 54 can be included with the card 100 to protect the images formed on the card 100, or to provide space for additional images or printed information. Also shown in FIG. 6 is yet another optional feature of the present invention, in which the card 100 is formed with multiple windows **36*a*, 36*b*, 36*c* each having a respective imaged transparent panel 38*a*, 38*b*, 38*c* to provide multiple changing images or a series of changing images to create a certain desired effect. It should also be understood that in the embodiments herein disclosed, the number, size or configuration of the window 36 is not in any way limited, and that different applications of the invention may require multiple windows of varying dimensions and positions on the front panel 16**.

An advantage of the present novelty card 10 is that it can be easily, rapidly and inexpensively manufactured using currently available in-line web offset printing and in-line finishing systems, using either the plow fold or ribbon positioning method. Thus, it should be understood that in the following description of the manner of manufacturing the card 10, various processing equipment will be identified to describe a certain step in the process for illustrative purposes only. Those skilled in the art of web offset, gravure or other printing, and in-line finishing processes, or in the overall manufacture of paper and plastic products, will appreciate that the specific machinery utilized and the exact sequence of steps involved in making the present novelty card 10 are variable.

Figure 7:
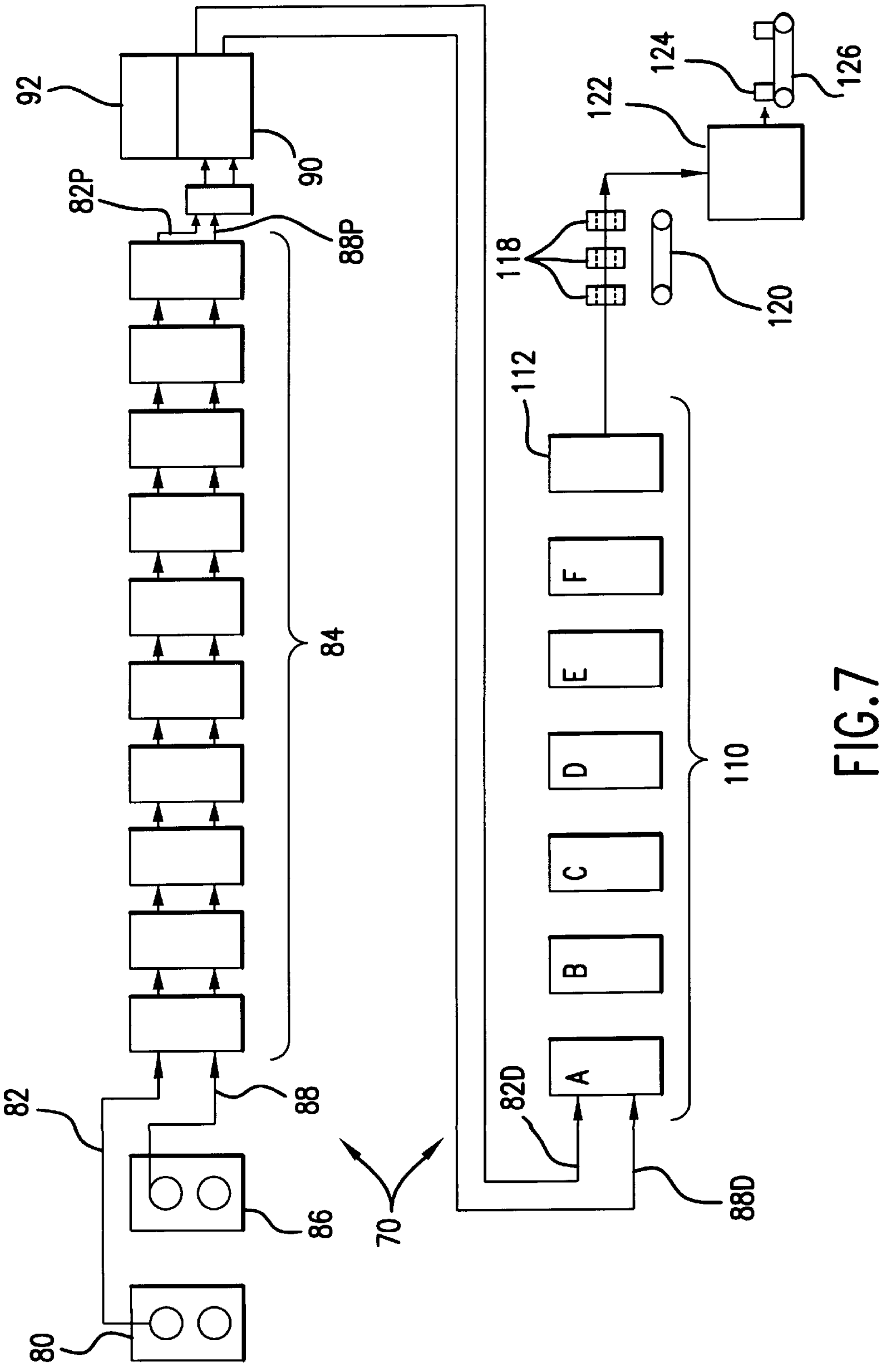
FIG. 7 depicts a simplified schematic representation of a production line for assembling the present novelty card.

As shown in FIG. 7, the method of making the present novelty card 10, 10' or 100 begins by providing an in-line printing/finishing apparatus, generally designated as 70. The apparatus has a first roll stand 80 providing a printable fine paper stock material web 82 to the first unit and then subsequent units of a multi-color web printing apparatus 84, such as unlimited web offset printing units, rotogravure units, flexo units, and other printing apparatus and methods.

The printable material 82 is preferably on opaque material such as fine offset paper stock, but other printable materials such as transparent or opaque plastics, Mylar® sheets and the like can be provided. It may be preferable in some applications of the invention to provide the first roll stand 80 with other materials, such as clear or metalized Mylar® brand plastic film and the like, or to provide a web that has at least the second side 34 of the rear panel 18 made of a material such as Mylar®. Generally, any material may be utilized, as long as such material is printable and provides some rigidity for the completed card 10.

A second roll stand 86 provides a clear transparent material web 88 to the printing apparatus 84, such as web offset printing units, rotogravure units or other printing apparatus. The transparent material web 88 is typically a plastic material, such as a polymer or an acetate material. The web of printable material 82 and the web of transparent material 88 are typically of a predetermined width in order to conserve waste and limit the amount of trimming required to complete the card 10. Preferably, the width of web 82 is slightly larger than the width of window 36 on front panel 16.

In the first several units of printer 84, the desired background image 48 is printed on the web 82 on what will eventually be the second side 34 of the rear panel 18. Similarly, in the several subsequent units of printer 84, the desired foreground image 46 is printed on the transparent material 88. If desired, the image 52 on the insert panel 40', or other desired images and print appearing on the cover panel 54 or elsewhere on the various panels are applied at this time. The printed webs, now designated as 82P and 88P respectively in FIG. 7, are passed from printing unit 84, to a web offset heat set oven and then to a chill roller apparatus 92, which cures or otherwise dries the ink on the webs to produce rigid and permanent, dried printed images on the webs, now designated 82D and 88D.

Upon leaving the heat set oven 90 and chill roll apparatus 92, the cured webs 82D and 88D are combined and enter an in-line finishing apparatus for additional processing. The dried webs 82D and 88D enter the in-line finishing system 110, which includes, but is not limited to, perforating machinery, silicone applicators, die cutters, angle bars or ribbon positioners, plow fold apparatus, remoist gum envelope adhesive applicators, folding apparatus, trimming and slitting apparatus, rotary cutters, and the like. Upon entering in-line finishing apparatus 110, the strip 12 of the printable material 82 is formed from web 82D in apparatus designated as A, which has as one of its functions, the optional forming of scorelines to form insert panel 14, the front panel 16, and the rear panel 18. The scorelines 20 and 22 can include perforations to facilitate folding and/or cutting of the panels during subsequent processing. In the preferred embodiment, scoring prior to die cutting and folding is an optional process.

At least one window 36 is formed through the front panel 20 in an apparatus designated as B in FIG. 7, which includes, but may not be limited to, the functions of die cutting or punching. In the alternative embodiment as depicted in FIG. 6, several windows, **36*a*, 36*b* and 36*c* are also formed at this point in the production process. As discussed previously, the window 36, is depicted throughout the drawings as a rectangle, but may be configured differently in respect to the desired specifications of the user. Regardless of its size or shape, the window 36 must generally be dimensioned so that both the foreground image 46 on the transparent panel 34 and the background image 48 on the second side 34 of rear panel 18 (as well as the image 52 on the insert 40') are visible through the window 36 in the completed card 10**.

Additionally, at this same stage in the production process, the thumb die cut notch 44 can be die cut out of the rear panel 18. The thumb notch 44 enables the user to grasp the insert 40 more securely when withdrawing the insert 40 from the pocket 42 to reveal the background image 48. Optionally, a second thumb die cut notch 44' can be utilized if desired without detracting from the invention.

After the window 36 is formed through the first panel 16, a coating of adhesive is applied, in what is designated as station C of the in-line processing unit 110 in FIG. 7, to the lateral side edges of web 88D of transparent material at predetermined locations to enable the transparent material to span the window 34. The adhesive must be applied to the transparent material 88D in locations on the lateral side edges that will not disturb the foreground image 46 or be visible through the window 36, and to accommodate the moving in-line production process utilized to produce the cards 10. Immediately following the application of the adhesive, the transparency 88D is positioned and secured to the second side 30 of the front panel 16 along the adhesive lines.

Virtually simultaneously with the securing process, the transparent panel 38 is separated or otherwise cut from the remaining web of transparent material 88D. Because the transparent material can be relatively expensive, the panel 38 need only be dimensioned to span the periphery of the window 36 and to provide a sufficient lateral border for the application of adhesive. The transparent panel 38 is positioned and secured to the second side 30 of the front panel 16 so that the foreground image 46 is viewable through the window 36.

Following application of the transparent panel 38 to the front panel 16, the slidable insert 40 is detached by plow folding and slitting, or by the slitting and position web ribbon process, or by other suitable means, from the strip 12 of printable material 82D. The slidable insert 40 can be formed using traditional plow or ribbon apparatus, here designated in FIG. 7 as station D in apparatus 110. Typically, the insert 40, or 40', is formed by folding the insert panel 14 along the scoreline 20 over onto the second side 30 of the front panel 16, and then detaching the insert panel 14 from panel 16.

Once the panel 14 has been folded over and is separated from the strip of printable material 12, the panel 14 is then laterally trimmed and then positioned to cover the window 36 on the second side 30 of front panel 16 as insert panel 40. The insert 40 is trimmed to have a width which is generally smaller than the width of the front panel 16 or rear panel 18 to enable it to slide freely within the envelope 42 formed when the lateral sides of panels 12 and 18 are adhered together along their lateral edges to form pocket 42. If the alternative insert 40' is used, then the insert 40' must be positioned onto the second side 30 of front panel 16 such that the image 52 is properly aligned with the foreground image 46 to produce the desired image 50' when insert 40' is inserted into the pocket 42 of completed card 10.

Following the formation of insert 40, the semi-complete card 10 enters what is designated in FIG. 7 as station E of apparatus 110, which has the ability to fold and apply adhesive. Thus, in station E the rear panel 18 is folded over along the scoreline 22, onto the second side 30 of the front panel 16 to enclose the insert 40 and the transparent panel 38. Simultaneously with the folding process, still at station E, adhesive is applied to the rear panel 18 along the lateral edge opposite the edge formed by scoreline 22 on its second side 30, such that the rear panel 18 can be secured to the lateral sides of the second side 30 of the front panel 16 without disturbing the insert 40 or the transparent panel 38. It will be appreciated that throughout the production process it is particularly important that the adhesive used and the securing process employed not disturb the insert 40 or the transparent panel 38, or otherwise unintentionally secure the insert 40 to either the rear or front panels, 16 or 18.

Once secured together at their lateral edges, the panels 16 and 18 form the envelope or pocket 42, having at least one opening through which the insert 40 can be slidably inserted and removed in order to produce the desired effect of the changing images. Once the front panel 16 and rear panel 18 are secured together, the assembly of the card 10 is practically complete.

Any necessary finishing processes are performed in what is designated in FIG. 7 as station F of in-line apparatus 110. It will be appreciated that these finishing processes may include trimming any excess material, pressing the card 10, treating the card 10 with a protective layer of silicone, labeling, and quality control/inspection. Once the functions at station F are completed, the fully assembled card 10 enters a rotary cutting and stacking apparatus 112, which separates each completed individual card 10 at the bottom edge thereof from the line of other cards being completed thereafter.

Rotary cutter unit 112 also stacks and discharges the individual completed cards 10 into stacks 118. The stacks 118 are transported on a second optional belt conveyor 120 into a packaging unit 122, which may be a separate unit and off press. The packaging unit 122 is capable of wrapping the stacks if desired. Additionally, the stacks 118 may be manually placed in cartons 124. The cartons 124 are in turn removed from the conveying system via a third belt conveyor 126 or by a human packing handler for delivery to the customer or to storage and inventory.

It is thus readily apparent that the construction of card 10 provides each of manufacture and assembly by in-line printing production equipment. All of the imagery to produce images 46, 48, 50, 50' and 52 is created using printing techniques, and not through the use of photographic processes. All of the adhesive application occurs in a linear fashion in the same direction as movement of webs 82 and 88 through the sequential production steps illustrated in FIG. 7. By attaching panels 16 and 18 only at their lateral sides, and causing all folds to occur only in a sideways direction, the linear speed of the production equipment can function at its maximum levels, producing a completed product that requires no hand finishing steps.

Figure 4:
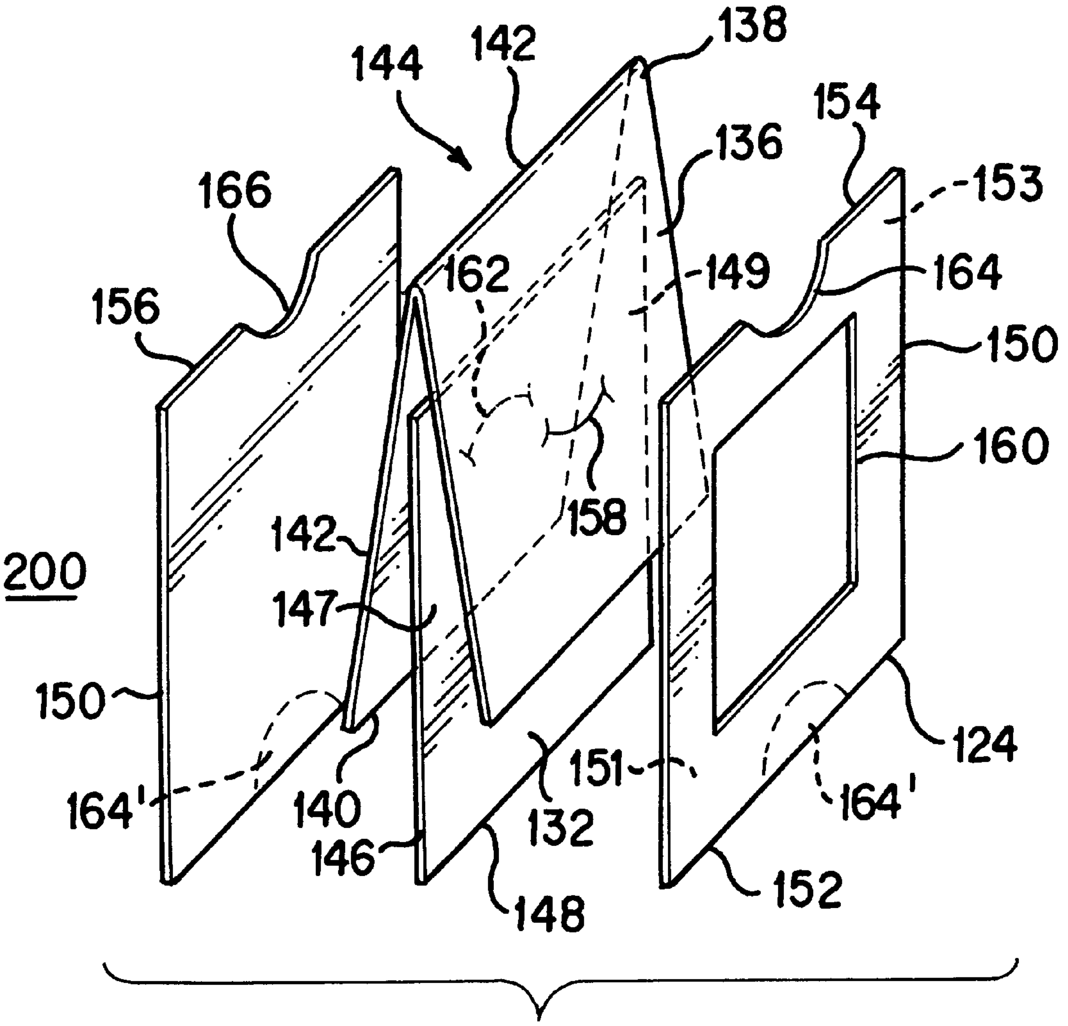
FIG. 4 depicts an exploded side perspective view of a second alternative embodiment of the present novelty card.

FIG. 4 depicts another embodiment of the card, generally designated 200, which is manufactured using the above-described process, where a transparent panel or sheet 136 is affixed at its upper edge 138 to an upper edge 142 of a rear panel 140. Once secured together, the transparent sheet 136 and the rear panel 140 form a removable insert assembly 144. Similar to the card 10, the card 200 includes a front panel 150. Front panel 150 also includes a window 160. A divider panel 146 is secured at each of its side edges 147, 149 to the corresponding side edges 151, 153 of the second side 154 of the front panel 150, and is straddled by the removable insert assembly 144. Additionally, a fourth panel designated as support backing panel 156 is then secured to the side edges 147, 149 of the divider panel 146. The removable insert assembly 144 has a lateral dimension less than the width of panels 150, 146, and 156, and is capable of sliding movement between the respective panels without contacting the lateral sides where the panels 150, 146 and 156 are bonded together.

The transparent sheet 136 has a foreground image 158 printed thereon. The foreground image 158 must be positioned on the transparent sheet 136 so that it is viewable through window 160 when fully inserted into the completed card 200. The rear panel 140 has printed thereon a background image 162, which is formed and aligned in the card 200 to combine with the foreground image 158 to produce a changed or combined image (not shown) when insert assembly 144 is removed from between panels 150, 146, and 156. Because the divider 146 is straddled by removable insert assembly 144, the divider initially functions to separate foreground image 158 on the transparent sheet 136 from the background image 162 on the rear panel 140. The divider 146, as the insert 40 in card 10 and 10', conceals the background image 162 until the user withdraws the removable insert 144 from the card 200.

The support backing panel 156 is secured to the side or lateral edges 151, 153 of the second side 154 of the front panel 150 to create at least one opening through which the removable insert assembly 144 can be slidably inserted and removed. Thumb die cut notches 164 and 166, as well as optional thumb die cut notches 164' and 166', may be formed respectively in front panel 150 and support backing panel 156 to provide the user with a better grasp of the removable insert assembly 144 when withdrawing it from the card 200.

The method of making the card 200 is to the extent possible, virtually identical to the process described above for producing card 10, with the addition of incorporating the formation of the divider panel 146 and support backing panel 156. Thus, it will be appreciated that a plurality of printable panels, preferably of opaque fine stock paper, can be incorporated into the process to attain the desired card as required by this or other embodiments. The printable panels are preferably opaque fine offset paper stock, but it is also contemplated that other printable materials may be substituted.

The schematic representation in FIG. 7 illustrates the method involved. Because the method of forming card 200 is substantially the same as that of card 10, only the points that are different will be discussed. Thus, upon entering the first units of printer 84, the background image 156 is formed on the portion of the printable material 12 which will eventually be the rear panel 140 of removable insert assembly 144. The foreground image 158 is also printed on the transparent sheet 136 by subsequent units of printer 84. Following any curing processes, the printed and dried webs 82D and 88D enter the in-line processing unit 110. At station A, window 160 is die cut through front panel 150, and the rear panel 140 is separated from the opaque web 82D and trimmed whereby its width is less than the width of panels 150, 146, and 156. Die cut thumb notches 164 and 166 may also be cut into front panel 150 and support backing panel 156 respectively at this point in the production process.

At station B, the transparent sheet 136 bearing the foreground image is then slit and separated from the transparent web 88D and trimmed to the same width as panel 140. Once separated, and positioned by ribboning over each other, a sufficient amount of adhesive is applied to an upper edge 138 of the transparent sheet 136, which is then secured to an upper edge 142 of the rear panel 140, to form the removable insert assembly 144. The transparent sheet 136 must be secured to the rear panel 140 so that the foreground image 158 and the background image 162 are aligned to form the desired changed or combined image.

The processing of the divider panel 146 and the front panel 150 can be accomplished either simultaneously with the formation of the removable insert assembly 144 or immediately afterwards. Upon entering Station C, the divider panel 146 is separated from the remaining web of printable material 82D and a sufficient amount of adhesive is applied to the side edges 147, 149. After the adhesive has been applied, the side edges 147, 149 of the divider panel 146 are secured to the side edges 151, 153 on the second side 154 of the front panel 150.

After the removable insert assembly 144 has been formed, the divider panel 146 has been affixed at its lateral edges to front panel 150 and the adhesive has been allowed to dry, station D will position the divider panel 146 between the elements of the removable insert assembly 144 so that the transparent sheet 136 is between the divider panel 146 and the front panel 150. The removable insert assembly 144 now straddles the divider panel 146, as seen in FIG. 4, allowing the foreground image to be viewable through the window 160.

Once the removable insert assembly 144 is in place, the support panel 156 is then separated from what remains of the web 82D at station E. A sufficient amount of adhesive is applied to the lateral edges of support panel 156, and then the support panel is secured to at least the side edges of the second side 154 of the front panel 150, leaving at least one opening or pocket formed between the support panel 156 and the divider panel 146.

Accordingly, in the completed card 200, there will be at least two pockets through which the sheets that comprise the removable insert assembly 144 can be slidably removed. As best seen in FIG. 4, one pocket, which slidably accepts the transparent sheet 136 of the removable insert 144, will be formed between the divider panel 146 and the front panel 150. The second pocket, which slidably accepts the rear panel 140 of the removable insert 144, is formed between the divider panel 146 and the support panel 156.

Following the assembly of the card 200 in processing unit 110, the card 200 enters station F for any finishing steps that may be required, and is then conveyed to the rotary cutter 112 for separation from the line. Once completed, the card 200 enters the transporting, packaging and shipping apparatus as described above regarding the production of card 10.

While this invention has been described as having a preferred embodiment and various alternative embodiments, it is understood that it is capable of further modifications, uses and/or adaptations which follow in general the principle of the invention, and including such departures from the present disclosure as come within known or customary practice in the art to which the invention pertains, as may be applied to the central features herein set forth, and which fall within the scope of the invention and the limits of the appended claims.

What is claimed is:

1. A method of forming a novelty card in an in-line web offset printing and in-line finishing system, the method comprising the steps of:

(a) providing a web of printable material of a predetermined width to an input of said in-line printing system;

(b) providing a web of a transparent material of a predetermined width to another input of said in-line printing system;

(c) forming a strip of said printable material having at least a front panel, a rear panel and an insert panel, each of said panels having a first side and a second side;

(d) printing at least one image on said second side of said rear panel;

(e) forming at least one image on said web of transparent material;

(f) forming at least one window in said front panel through which, upon assembly of the card, said printed image on said second side of said rear panel can be viewed;

(g) forming a panel from said web of transparent material bearing said at least one printed image, said panel being dimensioned to span said at least one window;

(h) securing lateral side edges of said panel of said transparent material to lateral side edges of said front panel so that said panel of transparent material spans said window and said image on said transparent material is viewable through said window;

(i) separating said insert panel from said strip and forming an insert therefrom;

(j) positioning said insert on said second side of said front panel;

(k) folding said rear panel onto said front panel so that said image on said second side of said rear panel is aligned with the interior of said window and viewable therethrough; and (l) securing the lateral edges of said second side of said rear panel to the lateral edges of said second side of said front panel along longitudinal seams thereby forming a pocket with at least one opening which slidably and removably accepts and retains said insert.

2. The method of claim 1 wherein said web of printable material is opaque.

3. The method of claim 1 further including the step of providing said web of printable material wherein at least said second side of said rear panel is clear plastic film.

4. The method of claim 1 further including providing said first side of said insert panel with an image positioned to be viewed through said window.

5. The method of claim 1 wherein said transparent material is a plastic material.

6. The method of claim 1 further including the step of forming scorelines on said printable material which define said at least front, rear and insert panels.

7. The method of claim 6 further including the step of providing said scorelines with perforations to facilitate folding and separating said insert from said front panel.

8. The method of claim 1 further including the steps of:

(a) forming said strip of said printable material so as to include a cover panel adjacent to said front panel; and (b) folding said cover panel over said front panel to protect said front panel and said images formed on said panel.

9. The method of claim 1 further including the step of curing said printable and transparent materials once said images have been formed thereon.

10. The method of claim 1 wherein said window is formed by die cutting.

11. The method of claim 1 further including the step of forming at least one thumb notch through said rear panel to facilitate the user's grasp of said insert upon sliding said insert in and out of said pocket in the completed card.

12. A method of forming a multi-panel novelty card on an in-line finishing system in a single pass, avoiding reorientation of the panels during processing, the card having a transparent film with a foreground image printed thereon and which spans a window in a front panel, the novelty card including a slidably removable insert which, when removed, allows the foreground image to be superimposed upon a background image printed on a rear panel to form a combined image, the method comprising the steps of:

(a) providing an input of the in-line finishing system with a web of printable material of a predetermined width;

(b) providing another input of the in-line finishing system with a web of transparent material of a predetermined width;

(c) forming a strip of said web of printable material having score lines that define at least a front panel, a rear panel and an insert panel, each of said panels having a first side and a second side;

(d) printing said foreground image on said transparent material;

(e) printing said background image in a predetermined location on said second side of said rear panel, said background image designed to combine with said foreground image to form a combined image;

(f) curing said printed images on said printable material and said transparent material;

(g) die cutting at least one window in said front panel of a predetermined size and configuration through which, upon assembly of the card, said printed image on said second side of said rear panel can be viewed;

(h) positioning a portion of said transparent material bearing said foreground image onto said front panel causing said foreground image to be visible through said window;

(i) securing lateral side edges of said portion of said transparent material to said front panel, said portion sufficient to span said window;

(j) separating said portion of transparent material from said web of transparent material;

(k) positioning said insert panel onto said second side of said front panel;

(l) separating said insert panel from said strip;

(m) trimming said insert panel to form an insert having a smaller width than said front panel or said rear panel;

(n) positioning said rear panel onto said second side of said rear panel so as to extend over said insert and said portion of said transparency;

(o) securing said rear panel onto said front panel along lateral side edges of said rear and front panels to define a pocket having at least one opening between said front and said rear panel that slidably accepts and retains said insert; and (p) separating the assembled panels from the remaining strips to form the completed card.

13. The method of claim 12 further including the steps of:

(a) forming said strip from said web of printable material to include a cover panel adjacent to said front panel; and (b) positioning said cover panel over said front panel to protect said front panel and said images formed on said transparent material.

14. The method of claim 12 further including the step of providing the card with at least one die cut thumb notch through said rear panel or said front panel to facilitate the user's grasp of said insert upon sliding said insert in and out of said pocket in the completed card.

15. The method of claim 12 further including the steps of:

(a) applying a sufficient amount of adhesive to the lateral side edges of said portion of said transparent material in predetermined locations to allow said portion of said transparent material to be adhesively secured to said front panel;

(b) applying a sufficient amount of adhesive to the lateral side edges of said second side of said rear portion in predetermined locations to allow said rear portion to be adhesively secured to said front panel without disturbing said insert or said portion of said transparency; and (c) properly curing said adhesions.

16. A method of forming a multiple panel novelty card with multiple images, the method comprising the steps of:

(a) providing a web of printable material of a predetermined width to an input of an in-line printing system;

(b) providing a web of a transparent material of a predetermined width to another input of an in-line printing system;

(c) forming a strip of said printable material having a plurality of panels, each of said panels having a first and a second side, an upper and lower edge and lateral side edges;

(d) forming at least one foreground image on said transparent material;

(e) forming a rear panel from a first of said panels;

(f) forming at least one background image on said first side of said rear panel;

(g) curing said printed images on said transparent material and said rear panel;

(h) forming a front panel from a second of said panels;

(i) forming at least one window in said front panel, said at least one window being of a predetermined size and configuration such that upon assembly, said at least one foreground and said at least one background image can be fully viewed therethrough;

(j) forming a sheet of said transparent material bearing said at least one foreground image, said sheet dimensioned to span said at least one window;

(k) forming a divider panel from a third of said panels having side edges;

(l) adhesively securing said side edges of said divider panel to corresponding side edges of said second side of said front panel;

(m) adhesively securing said top edge of said sheet of transparent material to said top edge of said first side of said rear panel to form a removable insert;

(n) positioning said divider between said sheets of said removable insert such that said at least one background image on said rear panel is separated and concealed from said at least one foreground image on said sheet of transparent material;

(o) forming a support-backing panel from a fourth panel;

(p) positioning said support backing panel upon said rear panel thereby forming an envelope with said front panel, and providing a path therein for said removable insert;

(q) adhesively securing said support backing panel to the side edges of said divider and said front panel, and providing at least one opening for said envelope to slidably accept and retain said removable insert; and (r) separating the assembled panels from the remaining strip to form the completed card.

17. The method of claim 16 further including the step of forming perforated scorelines which define said plurality of panels.

18. The method of claim 16 further including the step of forming at least one notch in said front and said rear panels to facilitate the user's grasp of said insert upon sliding said removable insert into and out of said envelope in the completed card.

19. The method of claim 16 further including the steps of:

(a) forming said sheet of transparent material and said rear panel with a predetermined width that facilitates the slidability of said insert in said envelope; and (b) positioning said foreground image and said background image such that when said removable insert is removed from the card, said images combine to form a desired combined image.

* * * * *